United States Patent [19]

Ginsburg

[11] Patent Number: 4,636,955

[45] Date of Patent: Jan. 13, 1987

[54] METHOD FOR ESTABLISHING CONTINUITY BETWEEN CONTIGUOUS DATA SETS

[75] Inventor: Merrill S. Ginsburg, Dallas, Tex.

[73] Assignee: Mobil Oil Corporation, New York, N.Y.

[21] Appl. No.: 605,754

[22] Filed: May 1, 1984

[51] Int. Cl.$^4$ .............................................. G06F 15/32
[52] U.S. Cl. ................................. 364/420; 250/252.1; 250/253; 364/421
[58] Field of Search ............... 364/575, 420, 573, 571, 364/812, 808, 820, 421–422; 73/382; 367/73, 42, 48; 250/252.1, 253

[56] References Cited

U.S. PATENT DOCUMENTS

| | | | |
|---|---|---|---|
| 2,734,682 | 2/1956 | Mayes | 364/812 |
| 3,576,985 | 5/1971 | Lawrence | 364/420 |
| 3,598,980 | 8/1971 | Lawrence | 364/420 |
| 4,031,370 | 6/1977 | Catherall | 235/152 |
| 4,136,388 | 1/1979 | Lindquist | 364/517 |

Primary Examiner—Jerry Smith
Assistant Examiner—G. Hayes
Attorney, Agent, or Firm—Alexander J. McKillop; Michael G. Gilman; Charles J. Speciale

[57] ABSTRACT

A method for merging two adjacent gridded map data sets mismatched at their boundaries is disclosed wherein a first data set is assumed to be correct and the second data set is corrected to the first. The two data sets are gridded beyond their common boundary to obtain a difference between them in an artificial overlap zone between them. The difference between the two data sets in the artificial overlap zone is fit by an orthogonal polynomial set. The polynomial function for a predetermined order is computed over the entire area occupied by one of the data sets and that data set is adjusted by the polynomial function to be consistent with the other data set.

2 Claims, 8 Drawing Figures

METHOD FOR ESTABLISHING CONTINUITY BETWEEN CONTIGUOUS DATA SETS

BACKGROUND OF THE INVENTION

In hydrocarbon exploration surveys, such as gravity surveys, a great deal of time and money is spent acquiring data. In many areas, surveys have already been performed and use of existing data is desirable from an efficiency viewpoint. However, data acquired from previous surveys may have a biasing factor throughout.

This problem generally pertains to data sets recorded several decades ago or recorded by different companies in more recent years. The reasons for the incompatibilities may be many. They could be due to: a difference in datums; an inconsistency in parameters utilized for standard data reduction procedures (such as density in the Bouguer and topographic corrections for gravity data); a difference in the quality of the recording instruments; a difference in the skills of the recording personnel; a difference in assigning values to those parameters more dependent on subjective estimations (such as the average elevations in a zone of the Hammer chart used to determine topographic corrections for gravity data); etc. As can be seen, some of the above reasons for the data mismatch may result in systematic errors or unequal bias while others may result in random errors or variable bias.

One method to alleviate data set mismatch at a common boundary is to adjust the data of one area by a constant to bring those data to the level of the second area. This type of adjustment is satisfactory in many, but not all, cases. The constant of adjustment is determined from an average of the difference of the values of the two data sets in a narrow area along their boundary. This narrow area is referred to as the artificial overlap zone or just the overlap zone.

If data adjustment by a constant shift is unacceptable, the previously recorded data for an adjacent area can not be used and new data has to be measured.

SUMMARY OF THE INVENTION

The present invention discloses a method for making two data sets compatible wherein the values of one of the data sets is adjusted on the basis of the nature of the difference of the two data sets in the vicinity of the boundary. The adjustment is made on the basis of an orthogonal polynomial fit to the data difference in the artificial overlap zone. The x, y, z random data values of both data sets are gridded at the same grid points in order to establish common points at which the two data sets each have a value. This involves extrapolating the grid for each data set beyond the common boundary of the sets. A polynominal is then fitted to the difference of the two data sets at the grid points in the artificial overlap zone. This polynomial is then determined over the entire area of one data set in order to adjust all the gridded values of that data set.

In an alternate embodiment, filtering techniques are disclosed for further smoothing of contour line aberrations across the boundary between the data sets.

DESCRIPTION OF THE PREFERRED EMBODIMENT

Figure 1:
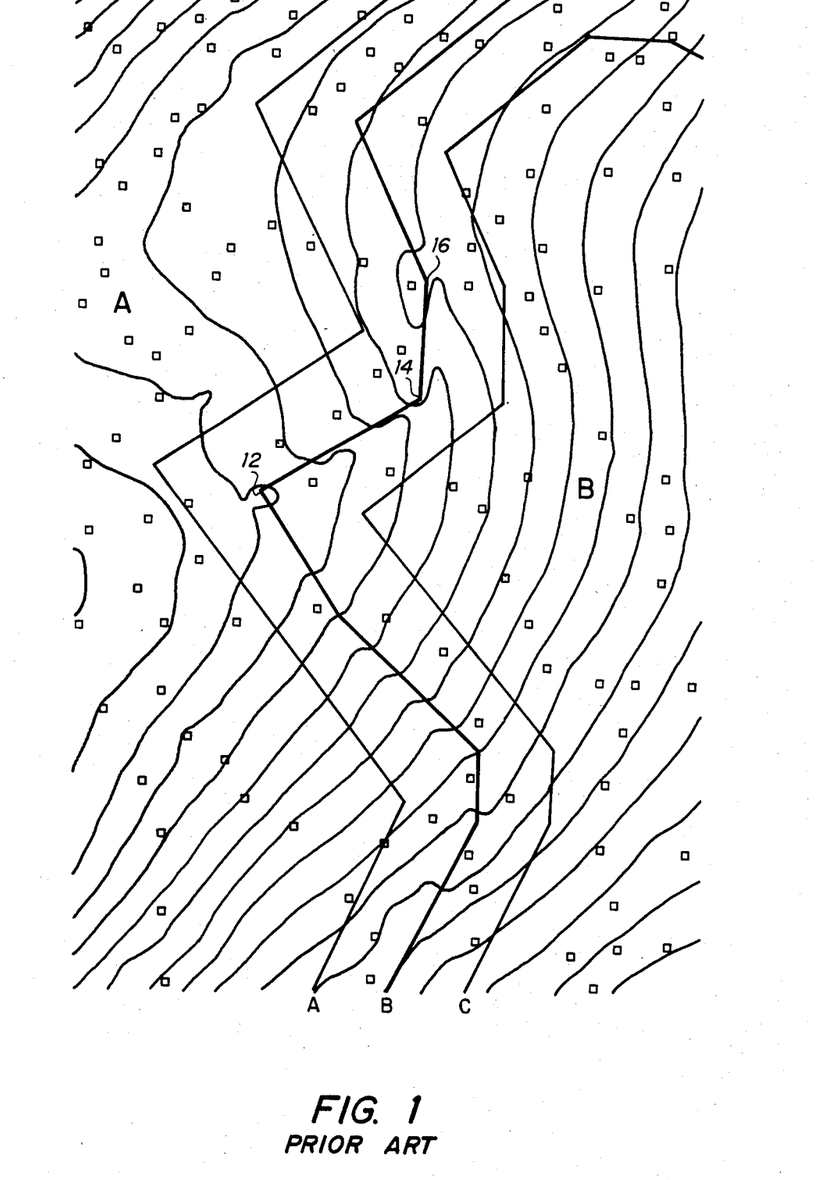
FIG. 1 is a graphical representation of gravity data.

FIG. 1 illustrates a resulting contour map from a prior art method of attempting to establish continuity between two contiguous data sets, A and B, by shifting the values of one data set by a constant. The artificial overlap zone defined as the area between lines A and C is established having center line B. As can be seen, prior art methods still result in a data discontinuity, specifically illustrated between points 12 and 14 and points 14 and 16. The contour lines around point 14 and point 16 demonstrate rapid changes over a very small area.

The present invention provides a method for taking two contiguous data sets having a great disparity along their boundary and smoothing out the disparity to provide consistency between the data sets.

Figure 2A:
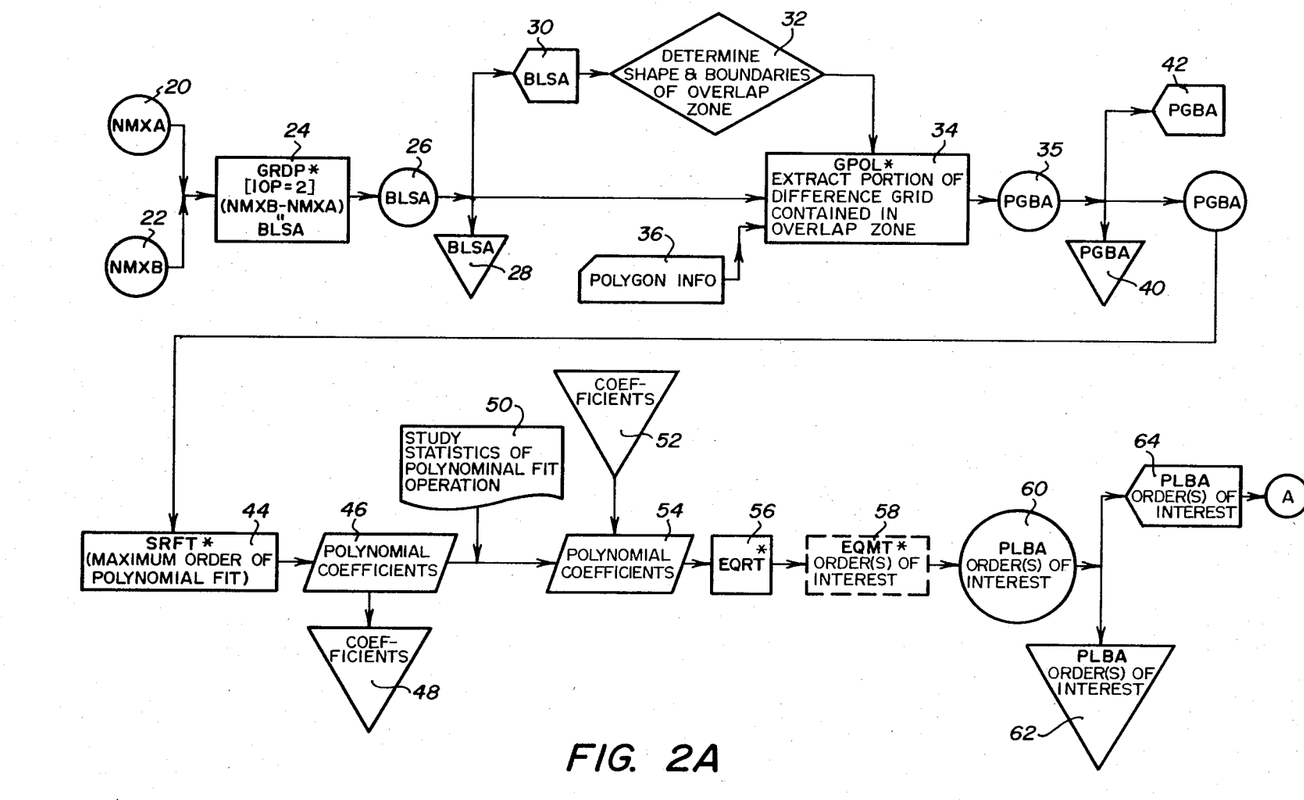
FIGS. 2A, 2B and 2C are block diagrams of a data processing method and associated symbol definitions.
Figure 2B:
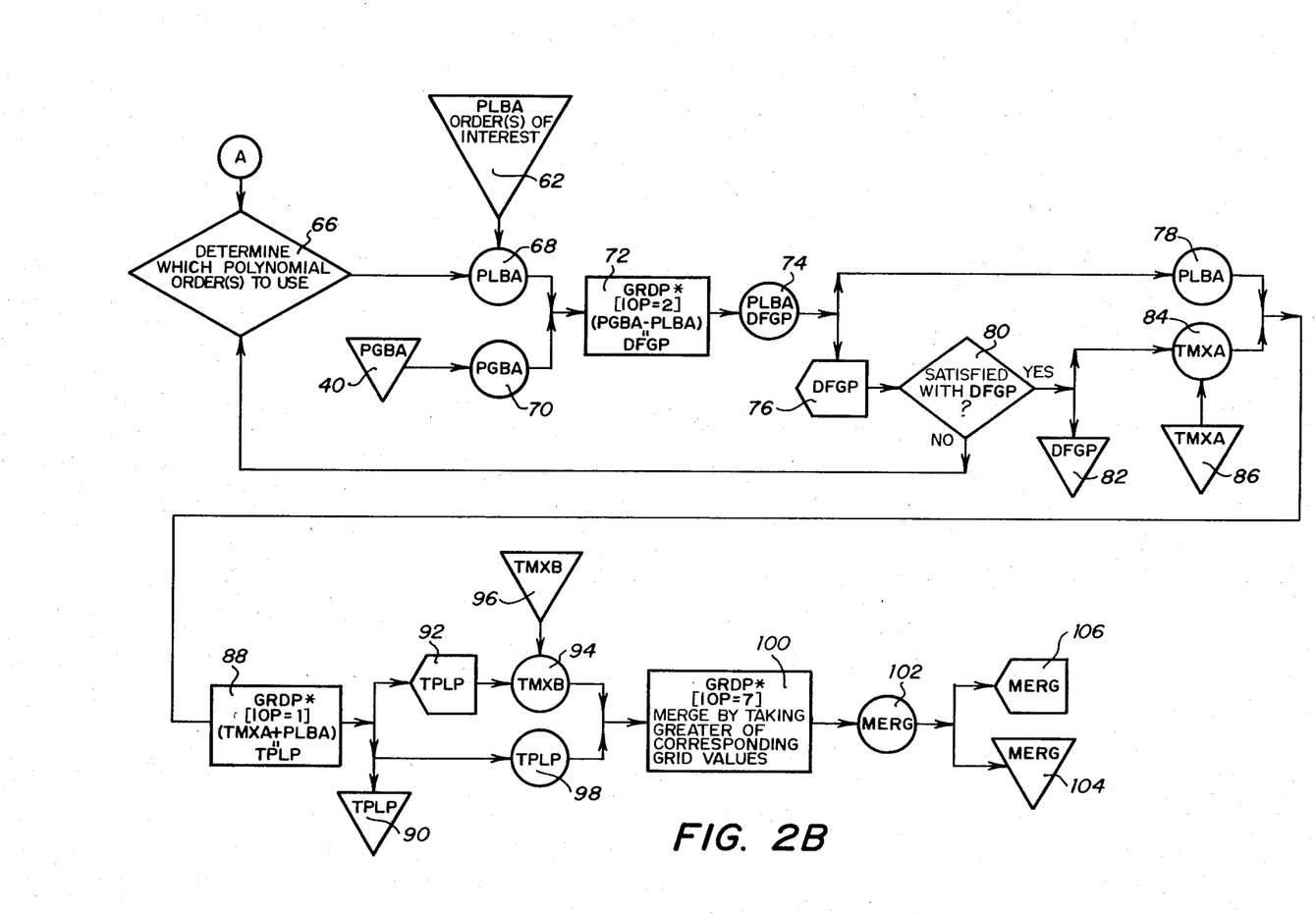
Figure 2C:
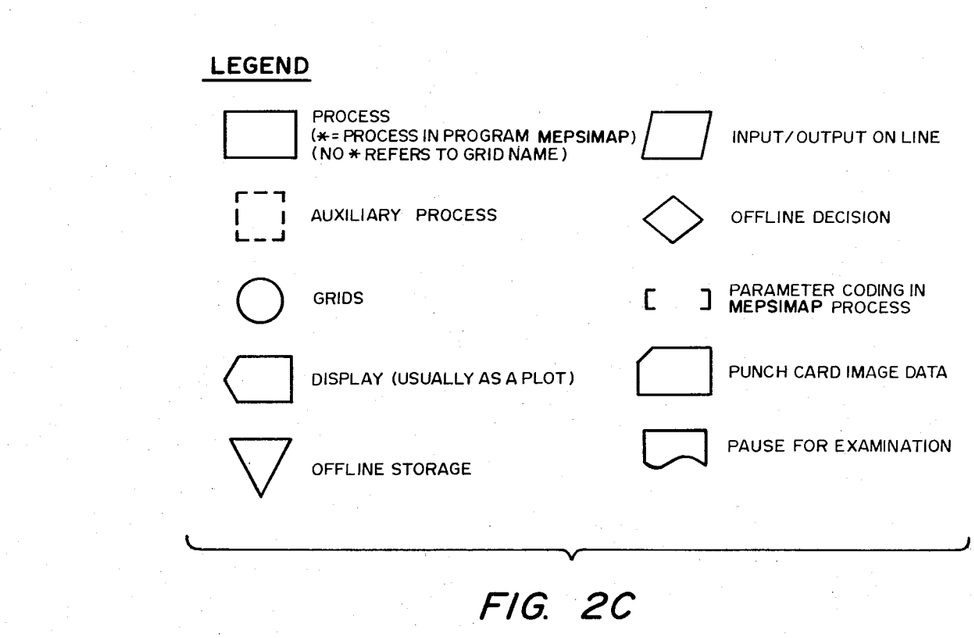

Referring now to FIGS. 2A, 2B and 2C, a flowchart of the present method is illustrated. A data set, NMXA, consisting of gravity data grid points based on data from an area A is illustrated at grid 20, and the data set, NMXB, consisting of gravity data grid points based on data from an area B is illustrated at grid 22 (see FIG. 4). It is important to note that grid NMXA, based on data in area A, covers all of areas A and B, and grid NMXB, based on data in area B, also covers all of areas A and B. Data grid set NMXA and data grid set NMXB are combined at block 24 where the values of set NMXA are subtracted from the values of set NMXB to provide a difference data grid set, identified as BLSA, over the total area at grid 26. Grid BLSA is fed to an offline storage 28 and to display 30. From display 30, a best fit determination is made at block 32 to lay out the shape and boundaries of an artificial overlap zone which envelopes the boundary between the two contigious data sets set A and set B; this is an offline decision. The defining of the specific shape and boundaries of the overlap zone is made with use of polygon information in block 36 and fed into block 34 where that portion of grid BLSA which lies in the artificial overlap zone is extracted and defined as grid PGBA, illustrated at grid 35 (see FIG. 5).

Figure 3:
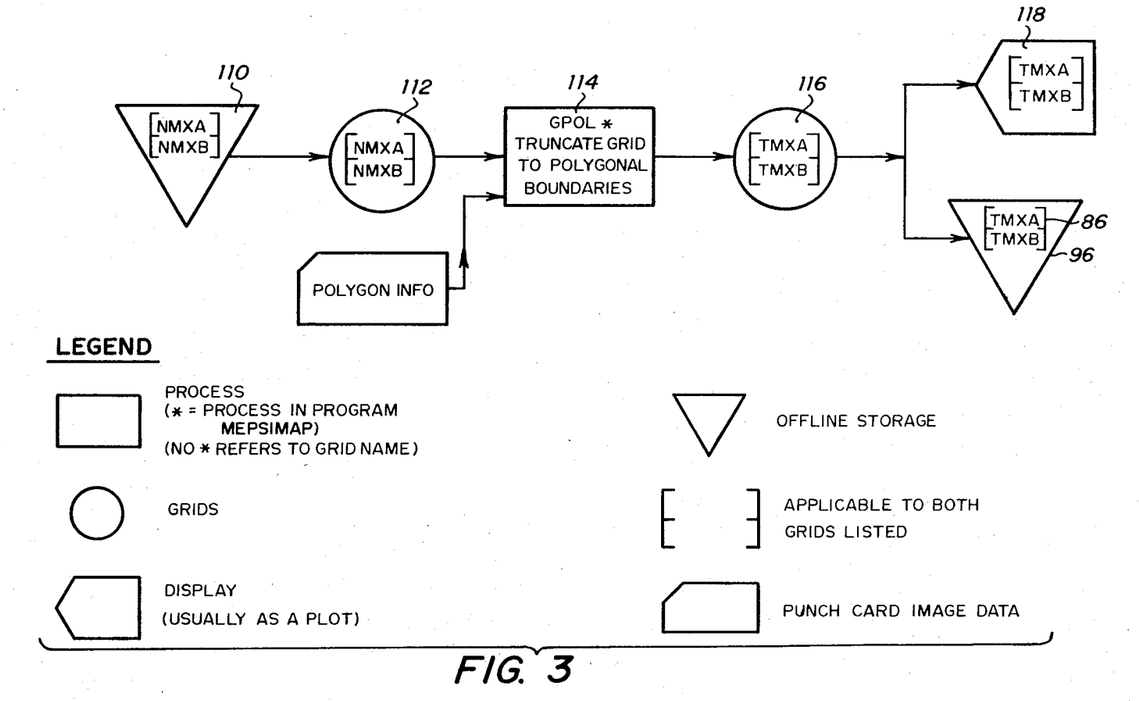
FIG. 3 is a block diagram of a preliminary process associated with the method illustrated in FIG. 2.
Figure 5:
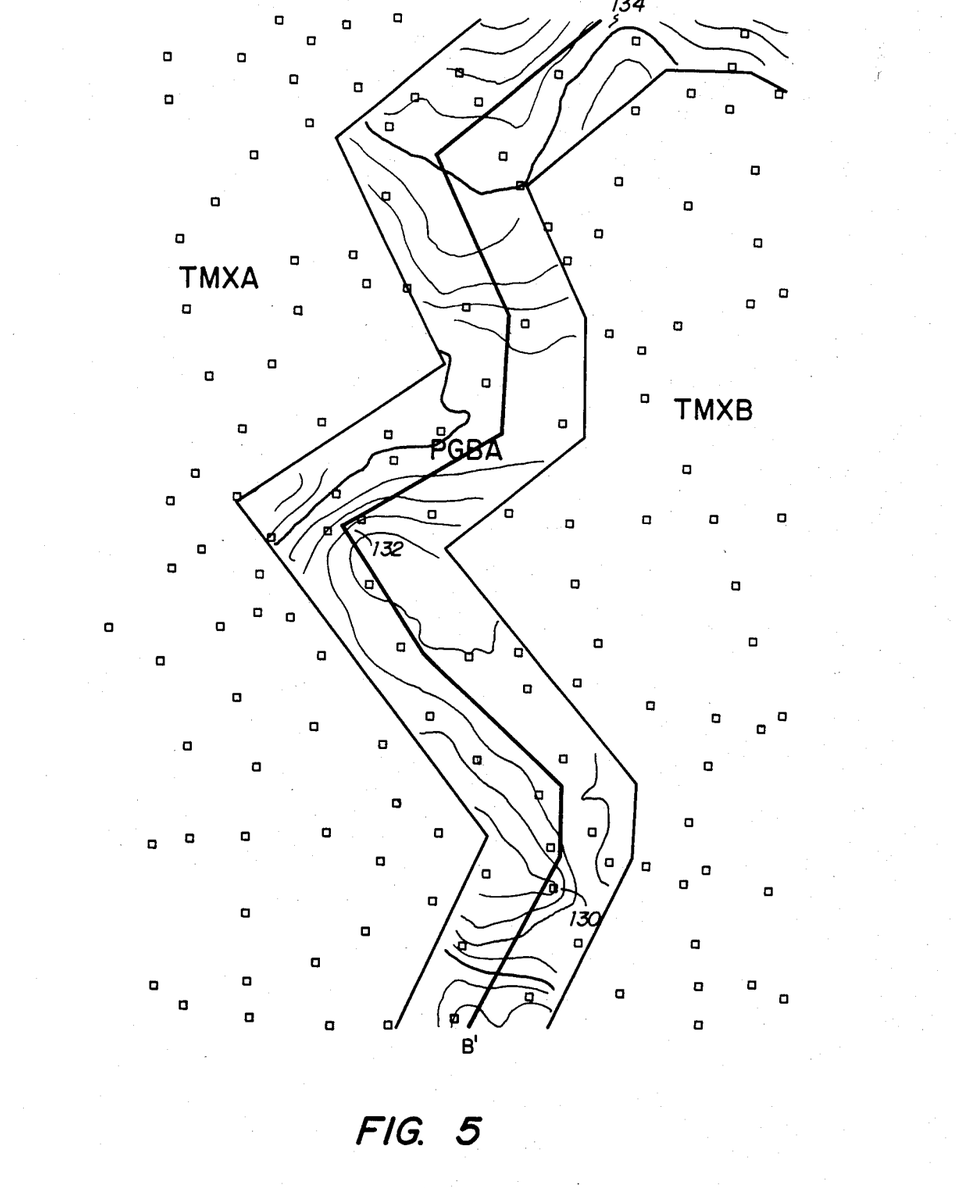
FIG. 5 is a graphical representation of the difference between the two data sets in the boundary area of FIG. 4 indicating an overlap zone.

Grid PGBA, thus, is the grid comprising the artificial overlap zone determined by the shape and boundaries fed into block 34 from block 36 after being defined in block 32 (see FIG. 5). Grid PGBA is fed to offline storage at block 40 and displayed at block 42. Grid PGBA is also fed to block 44 where it is approximated by a maximum order least squares fit of orthogonal polynomials (8th order in this case). After the polynomial fit is achieved on grid PGBA, the polynomial coefficients are collected at block 46 and output to offline storage at block 48. At this point a study of statistics of the polynomial fit may be performed at block 50. The polynomial coefficients are fed from block 52 to a line input at 54. From analysis of the polynomial coefficients and statistics, an orthogonal polynomial computation of maximum order or less over the entire area encompassed by areas A and B is performed at blocks 56 and 58. A grid (or grids) PLBA which is produced from the desired polynomial fit (or fits) to grid PGBA and covers the entire areas of A and B; it may be determined at grid 60. Grid PLBA, thus, is determined from the data in the overlap zone only but is computed and defined over the entire area of interest. Grid PLBA is put in offline storage at block 62 and displayed at block 64. From the displays of various grids PLBA representing various polynomial orders of interest, a determination may be made at block 66 as to which polynomial order(s) to use. Referring now to FIG. 2B, grid PLBA, here representing one polynomial of an order of interest is input from block 62 at grid 68. Grid PGBA is fed from offline storage 40 at grid 70. Grid PLBA is subtracted from grid PGBA in the artificial overlap zone to produce grid DFGP, which is defined in the overlap zone only. Grids PLBA and DFGP are illustrated at grid 74 with grid DFGP going to display 76 and grid PLBA going to grid circle PLBA 78. From the display of grid DFGP, a decision is made at block 80 as to whether the values of grid DFGP are small enough to indicate a suitable fit of PLBA to PGBA. If grid DFGP is not suitable, the process is reinitiated from block 66 with a different polynomial order being represented by grid PLBA. If grid DFGP is suitable, grid DFGP is fed to offline storage at block 82 and fed to grid TMXA at grid 84. Grid TMXA represents that portion of grid NMXA which is confined to area A (see FIG. 3). Grid TMXA is fed from offline storage line 86. Grid PLBA and grid TMXA are combined at block 88 to produce a new grid, TPLP which is a summation of the polynomial fit grid PLBA and grid TMXA over area A. TPLP, thus, is grid TMXA adjusted to the level of grid TMXB by the addition of the polynomial PLBA to TMXA in area A; grid TMXB is that portion of grid NMXB confined to area B (see FIG. 3). Grid TPLP is fed to offline storage at block 90 and displayed at block 92. Grid TPLP (at 98) which covers area A is combined with grid TMXB (at 94) which covers area B and which is fed from offline storage 96. The combination is performed at block 100 to form a grid MERG at 102. Grid MERG covers all of areas A and B. Grid MERG is now fed to offline storage 104 and displayed at 106 (see FIG. 6). Refer now to FIG. 3, an illustration of the flowchart to arrive at grids TMXA and TMXB. Grid data NMXA and NMXB are fed from offline storage 110 to grid circle 112. Data concerning the polygon boundaries which define areas A and B are fed to block 114 where each grid, NMXA and NMXB, is truncated to the polygon boundaries defining areas A and B, respectively. Resulting grids TMXA and TMXB, in areas A and B, respectively, are produced at grid 116 and are fed to offline storage grids 86 and 96, respectively, and display 118.

Figure 4:
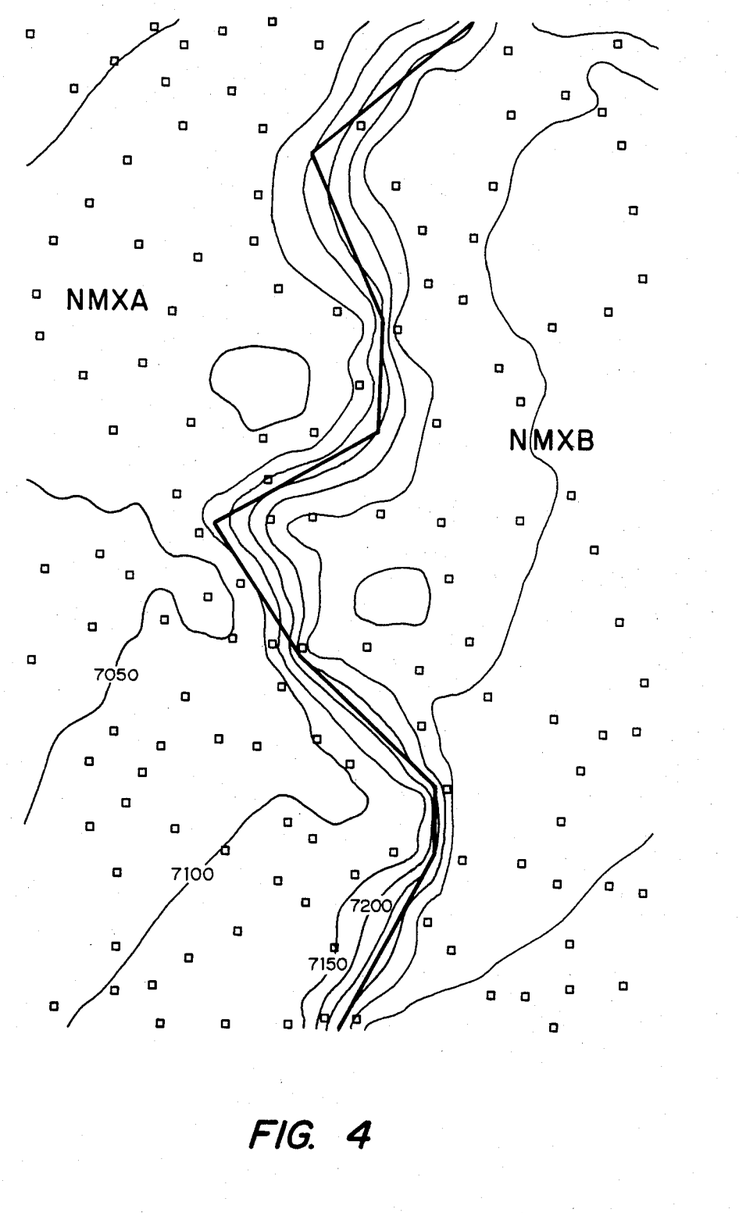
FIG. 4 is a graphical representation of a boundary between two sets of gravity data.

Referring to FIG. 4, the gridded data TMXA and TMXB are illustrated having a boundary B'.

FIG. 5 illustrates the artificial overlap zone containing grid PGBA, which defines the pertinent area of difference between data sets NMXA and NMXB.

As can be seen along boundary B' in FIG. 4, the contour lines indicating a gravity reading are extremely close together, indicating a mismatch between data set TMXA and data set TMXB. In FIG. 5, mismatches are apparent along boundaries B prime at points 130, 132 and 134.

Figure 6:
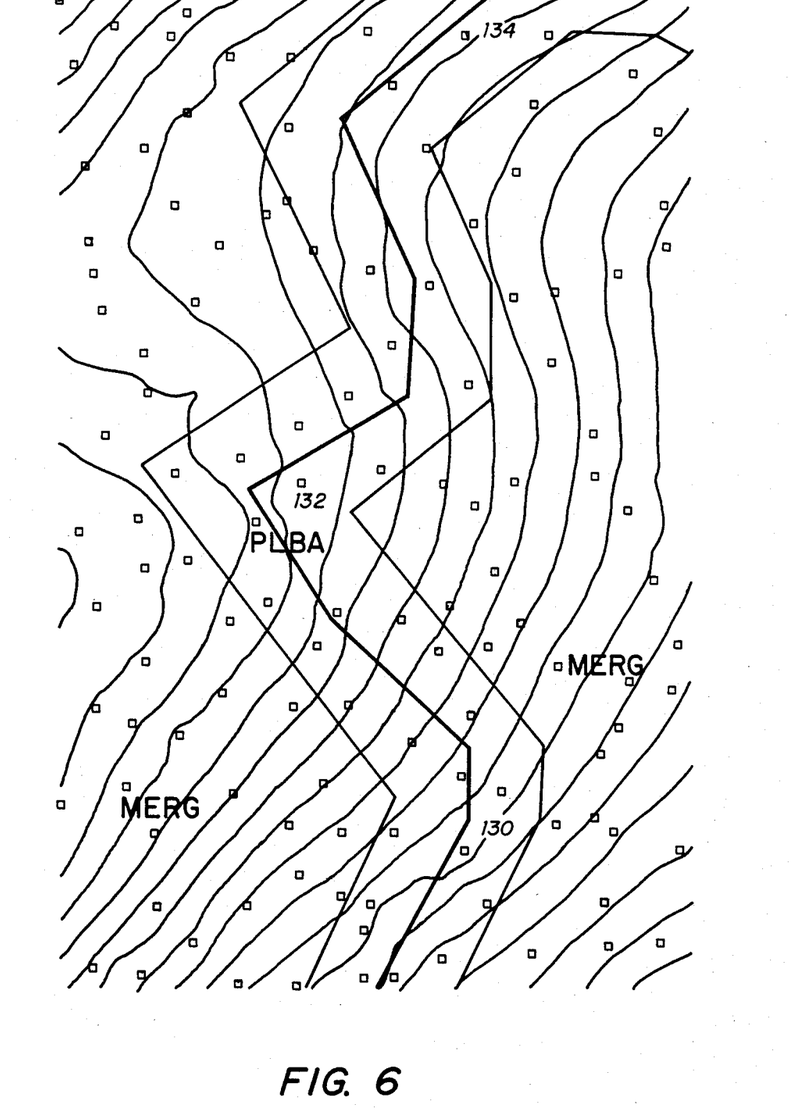
FIG. 6 is a graphical representation of the corrected gravity data of FIG. 4.

FIG. 6 illustrates data set MERG where data set TMXA has been modified by a polynomial to remove mismatches between the data sets existing as earlier obtained in FIG. 4.

As can be seen from the foregoing Description of the Preferred Embodiment, one of two contiguous data sets which may be taken at different times by different people using different instruments can be modified by an orthogonal polynomial fit to obtain one meaningful data set. By establishing an artificial overlap zone, a difference set is calculated in that zone and fit by a relatively high order orthogonal polynomial. A particular polynomial of that or lower order is then deemed to be the best fitting polynomial. From this latter polynomial, operators are used to modify one of the initial two data sets to make it compatible with the other set. The two data sets are then combined into one.

The present invention has been illustrated by way of preferred embodiment, it is to be understood that it is not to be limited thereto, but only by the scope of the following claims.

I claim:

1. A method for establishing continuity between two sets of contiguous similar data having an unequal bias there between comprising the steps of:
   receiving a first set of data and a second contiguous set of data;
   establishing an artificial overlap zone between said contiguous data sets;
   determining a difference set of data for said artificial overlap zone;
   fitting a relatively high order orthogonal polynomial to said difference set of data;
   determining a "best fit" orthogonal polynomial from the aforementioned orthogonal polynomial which best fits the difference data set;
   modifying said second contiguous set of data by said "best fit" polynomial; and
   combining said first set of data with said modified second contiguous set of data to establish continuity between said first set and said second contiguous set of data.

2. A method for establishing continuity between two contiguous sets of data having a variable bias there between comprising the steps of:
   receiving a first set of data and a second set of data, each set comprising a plurality of data points having a predetermined value;
   selecting a portion of said data points of said first set and a contiguous portion of said data points of said second set to provide an artificial overlap zone;
   determining a different set of grid data for said overlap zone having a plurality of data points, each of said data points having a value equal to the difference of grids derived from said portion and said contiguous portion;
   fitting a relatively higher order orthogonal polynomial to said difference gridded set for said overlap zone;
   altering one of said first set of data and said second set of data by said relatively higher order polynomial or by an orthogonal polynominal of lower order derived from said relatively higher order polynomial, with said polynomial computed over the entire area occupied by the data set to be altered; and
   displaying said altered sets of data with said unaltered set of data.

* * * * *